United States Patent
Liu et al.

(10) Patent No.: US 11,514,935 B1
(45) Date of Patent: Nov. 29, 2022

(54) MAGNETIC READ SENSORS HAVING STABILIZED UPPER READERS, AND RELATED METHODS

(71) Applicant: Western Digital Technologies, Inc., San Jose, CA (US)

(72) Inventors: Xiaoyong Liu, San Jose, CA (US); Ji Li, Shenzhen (CN); Goncalo Marcos Baião De Albuquerque, San Jose, CA (US); Daniele Mauri, San Jose, CA (US); Yukimasa Okada, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/500,572

(22) Filed: Oct. 13, 2021

(30) Foreign Application Priority Data

Sep. 9, 2021 (CN) .......................... 202111054466.6

(51) Int. Cl.
*G11B 5/39* (2006.01)
*G11B 5/11* (2006.01)
*G11B 5/21* (2006.01)

(52) U.S. Cl.
CPC .............. *G11B 5/3951* (2013.01); *G11B 5/11* (2013.01); *G11B 5/397* (2013.01); *G11B 5/3909* (2013.01); *G11B 5/3912* (2013.01); *G11B 5/3932* (2013.01); *G11B 5/21* (2013.01)

(58) Field of Classification Search
None
See application file for complete search history.

(56) References Cited

U.S. PATENT DOCUMENTS

| | | |
|---|---|---|
| 8,873,204 B1 | 10/2014 | Gao et al. |
| 9,042,059 B1 | 5/2015 | Katine et al. |
| 9,401,163 B2 | 7/2016 | McKinlay et al. |
| 9,570,100 B1 | 2/2017 | Freitag et al. |
| 9,786,305 B1 | 10/2017 | Li et al. |
| 9,870,791 B1 | 1/2018 | Sapozhnikov et al. |
| 10,115,418 B2 | 10/2018 | Quan et al. |
| 10,777,222 B1 | 9/2020 | Liu et al. |

(Continued)

OTHER PUBLICATIONS

Lippman, Thomas et al., "Spinstand demonstration of areal density enhancement using two-dimensional magnetic recording (invited)", Journal of Applied Physics, vol. 117, Issue 17, 2015, http://dx.doi.org/10.1063/1.4914051.

*Primary Examiner* — Craig A. Renner
(74) *Attorney, Agent, or Firm* — Patterson & Sheridan, LLP; Steven H. VerSteeg

(57) ABSTRACT

Aspects of the present disclosure generally relate to magnetic recording heads of magnetic recording devices. A read head includes a first reader, an insulating separation layer, and a second reader disposed above the insulating separation layer. The second reader includes a magnetic seed layer and a cap layer. The second reader includes a first upper free layer disposed between the magnetic seed layer and the cap layer, and a second upper free layer disposed between the first upper free layer and the cap layer. The second reader includes a barrier layer. In one implementation the second reader includes an antiferromagnetic (AFM) layer disposed between the magnetic seed layer and the insulating separation layer to pin the magnetic seed layer.

19 Claims, 10 Drawing Sheets

(56) References Cited

U.S. PATENT DOCUMENTS

2011/0279923 A1\* 11/2011 Miyauchi et al. ... G11B 5/3912
   360/319
2016/0336030 A1\* 11/2016 Xiao et al. ........... G11B 5/3932
2017/0084296 A1    3/2017 Garfunkel et al.

\* cited by examiner

MAGNETIC READ SENSORS HAVING STABILIZED UPPER READERS, AND RELATED METHODS

CROSS-REFERENCE TO RELATED APPLICATIONS

This application claims priority to China patent application serial number 202111054466.6, filed Sep. 9, 2021, which is herein incorporated by reference in its entirety.

BACKGROUND OF THE DISCLOSURE

Field of the Disclosure

Aspects of the present disclosure generally relate to magnetic recording heads of magnetic recording devices, such as magnetic read sensors of magnetic read heads of hard disk drives (HDD).

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track are narrowed. Attempts to achieve increasing requirements of advanced narrow gap reader sensors of read heads to achieve reading of higher recording densities have been proposed.

However, attempts to narrow reader sensor dimensions, to narrow reader-to-reader spacing, and to increase recording densities can induce instability in reader sensors and can cause sensor failure. For example, two dimensional magnetic recording (TDMR) can be used for increased areal density capability (ADC) and read performance, but can involve instability for sensors. The instability can worsen as when sizes of TDMR devices are narrowed.

Therefore, there is a need in the art for an improved magnetic read head that facilitates enhanced reader resolution performance while facilitating stability for readers.

SUMMARY OF THE DISCLOSURE

Aspects of the present disclosure generally relate to magnetic recording heads of magnetic recording devices. A read head includes a first reader, an insulating separation layer, and a second reader disposed above the insulating separation layer. The second reader includes a magnetic seed layer and a cap layer. The second reader includes a first upper free layer disposed between the magnetic seed layer and the cap layer, and a second upper free layer disposed between the first upper free layer and the cap layer. The second reader includes a barrier layer. In one implementation, the second reader includes an antiferromagnetic (AFM) layer disposed between the magnetic seed layer and the insulating separation layer to pin the magnetic seed layer. In one implementation, the first reader includes a lower shield, a second shield, and a first antiferromagnetic (AFM) layer disposed above the second shield; and the second reader includes a second AFM layer disposed between the magnetic seed layer and the insulating separation layer to pin the magnetic seed layer, and a third AFM layer disposed above an upper shield of the second reader.

In one implementation, a read head for magnetic recording devices includes a first reader. The first reader includes a lower shield, a first lower free layer disposed above the lower shield, a second lower free layer disposed above the first lower free layer, and a second shield disposed above the second lower free layer. The read head includes an insulating separation layer disposed above the first reader. The read head includes a second reader. The second reader includes a magnetic seed layer disposed above the insulating separation layer, and an antiferromagnetic (AFM) layer disposed between the magnetic seed layer and the insulating separation layer to pin the magnetic seed layer. The second reader includes a cap layer, a first upper free layer disposed between the magnetic seed layer and the cap layer, and a second upper free layer disposed between the first upper free layer and the cap layer. The second reader includes a barrier layer disposed between the first upper free layer and the second upper free layer, and an upper shield disposed above the cap layer.

In one implementation, a read head for magnetic recording devices includes a first reader. The first reader includes a lower shield, a magnetic seed layer disposed above the lower shield, and a first lower free layer disposed above the magnetic seed layer. The first reader includes a second lower free layer disposed above the first lower free layer, and a second shield disposed above the second lower free layer. The first reader includes a first antiferromagnetic (AFM) layer disposed above the second shield. The read head includes an insulating separation layer disposed above the first AFM layer. The read head includes a second reader. The second reader includes a magnetic seed layer disposed above the insulating separation layer, a second AFM layer disposed between the magnetic seed layer of the second reader and the insulating separation layer to pin the magnetic seed layer of the second reader. The second reader includes a cap layer. The second reader includes a first upper free layer disposed between the cap layer and the magnetic seed layer of the second reader, a second upper free layer disposed between the first upper free layer and the cap layer, and an upper shield disposed above the cap layer.

In one implementation, a read head for magnetic recording devices includes a first reader. The first reader includes a lower shield, a first lower free layer disposed above the lower shield, and a second lower free layer disposed above the first lower free layer. The first reader includes a second shield disposed above the second lower free layer. The read head includes an insulating separation layer disposed above the first reader. The read head includes a second reader. The second reader includes a magnetic seed layer disposed above the insulating separation layer, a first ferromagnetic (FM) layer disposed between the insulating separation layer and the magnetic seed layer, and a second FM layer disposed between the first FM layer and the magnetic seed layer. The FM layer and the second FM layer are magnetized antiparallel to each other. The second reader includes a non-magnetic spacer layer disposed between the first FM layer and the second FM layer. The non-magnetic spacer layer is formed of ruthenium (Ru). The second reader includes a cap layer, a first upper free layer disposed between the magnetic seed layer and the cap layer, a second upper free layer disposed between the first upper free layer and the cap layer, and an upper shield disposed above the cap layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
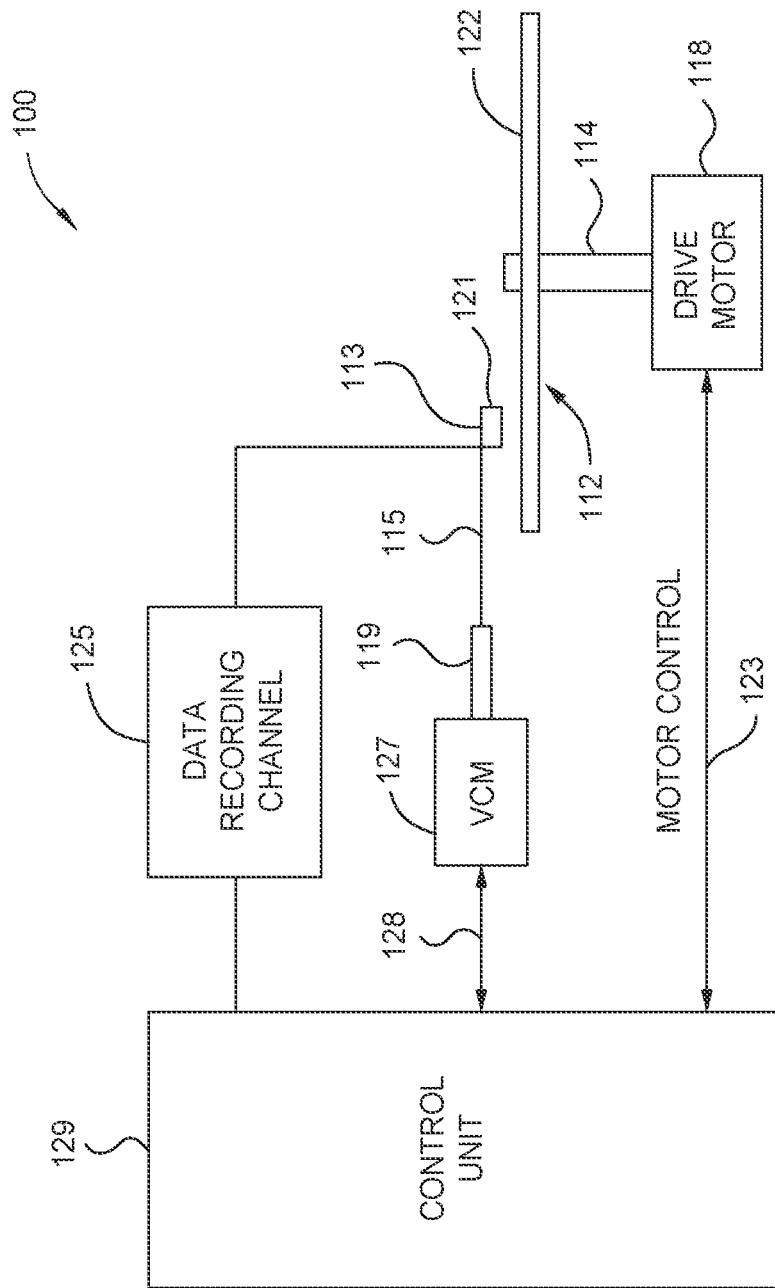
FIG. 1 is a schematic view of a magnetic media drive having a magnetic write head and a magnetic read head, according to one implementation.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to magnetic recording heads of magnetic recording devices. A read head includes a first reader, an insulating separation layer, and a second reader disposed above the insulating separation layer. The second reader includes a magnetic seed layer and a cap layer. The second reader includes a first upper free layer disposed between the magnetic seed layer and the cap layer, and a second upper free layer disposed between the first upper free layer and the cap layer. The second reader includes a barrier layer. In one implementation the second reader includes an antiferromagnetic (AFM) layer disposed between the magnetic seed layer and the insulating separation layer to pin the magnetic seed layer. In one implementation, the first reader includes a lower shield, a second shield, and a first antiferromagnetic (AFM) layer disposed above the second shield; and the second reader includes a second AFM layer disposed between the magnetic seed layer and the insulating separation layer to pin the magnetic seed layer, and a third AFM layer disposed above an upper shield of the second reader.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

It is also to be understood that aspects disclosed herein, such as the magnetoresistive devices, may be used in magnetic sensor applications outside of HDD's and tape media drives such as TED's, such as spintronic devices other than HDD's and tape media drives. As an example, aspects disclosed herein may be used in magnetic elements in magnetoresistive random-access memory (MRAM) devices (e.g., magnetic tunnel junctions as part of memory elements), magnetic sensors or other spintronic devices. It should be noted that while the term "reader" or "read head" are used to described various embodiments shown below, those skilled in the art will recognize the disclosed stacks and structures can be considered as a sensor or magnetic tunnel junction, or part of a sensor or magnetic tunnel junction. Thus the scope of disclosure is intended to cover those implementations as well.

FIG. 1 is a schematic view of a magnetic media drive 100 having a magnetic write head and a magnetic read head, according to one implementation. The magnetic media drive 100 may be a single drive/device or may include multiple drives/devices. The magnetic media drive 100 includes a magnetic recording medium, such as one or more rotatable magnetic disk 112 supported on a spindle 114 and rotated by a drive motor 118. For the ease of illustration, a single disk drive is shown according to one implementation. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a write head and a read head having a two-dimensional magnetic recording (TDMR) device. As the magnetic disk 112 rotates, the slider 113 moves radially in and out over the disk surface 122 so that the head assembly 121 may access different tracks of the magnetic disk 112 where desired data are written or read. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field. The direction and speed of the coil movements are controlled by the motor current signals supplied by control unit 129.

During operation of the magnetic media drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the magnetic media drive 100 are controlled in operation by control signals generated by control unit 129, such as access control signals and internal clock signals. The control unit 129 includes logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. The magnetic media drive 100 of FIG. 1 may include a plurality of media (or disks), a plurality of actuators, and/or a plurality of sliders.

Figure 2:
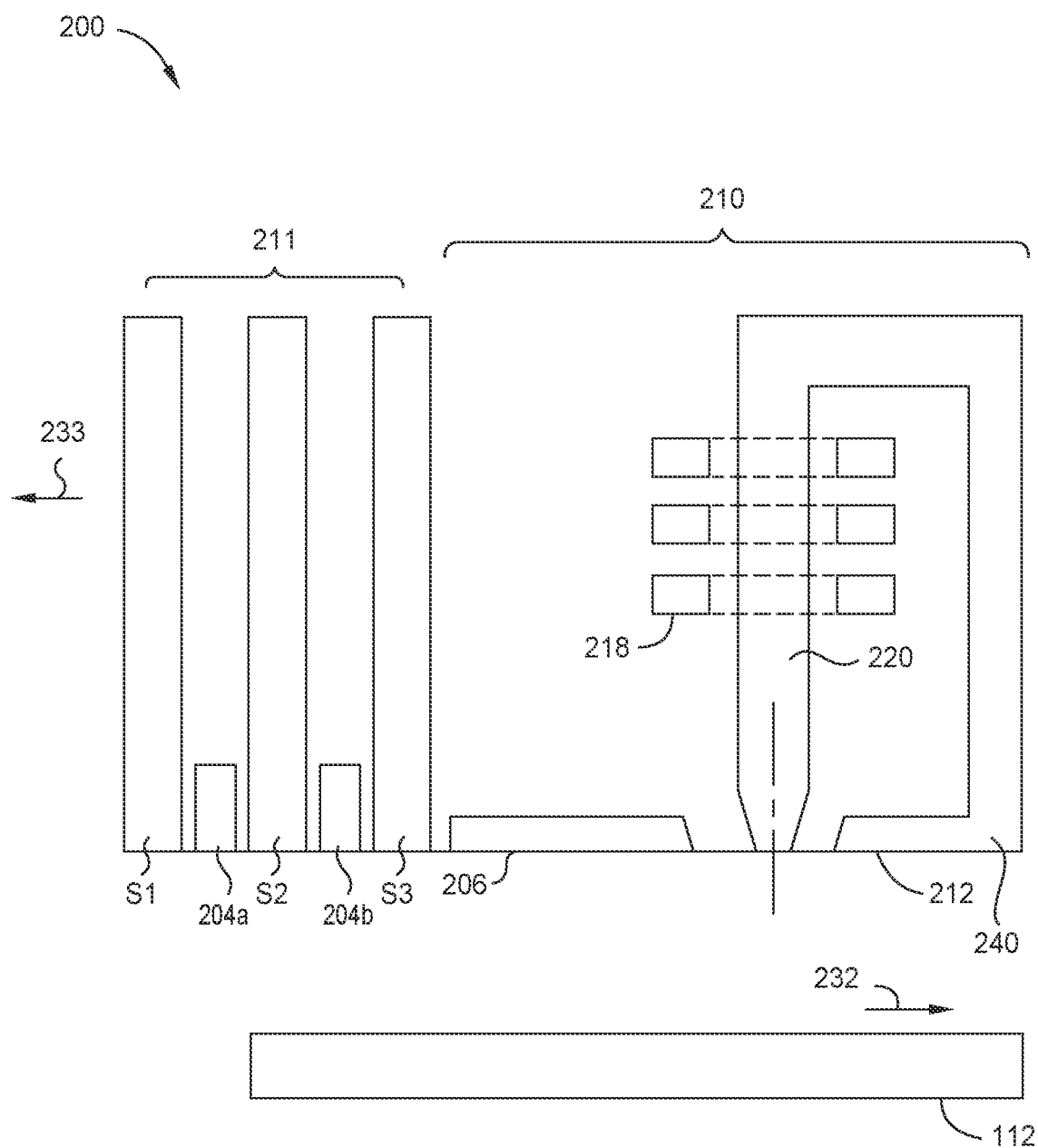
FIG. 2 is a schematic cross sectional side view of a head assembly facing the magnetic disk or other magnetic storage medium, according to one implementation.

FIG. 2 is a schematic cross sectional side view of a head assembly 200 facing the magnetic disk 112 or other magnetic storage medium, according to one implementation. The head assembly 200 may correspond to, or be used as, the head assembly 121 shown in FIG. 1. The head assembly 200 includes a media facing surface (MFS) 212, such as an air bearing surface (ABS), facing the magnetic disk 112. As shown in FIG. 2, the magnetic disk 112 relatively moves in the direction indicated by the arrow 232 and the head assembly 200 relatively moves in the direction indicated by the arrow 233.

The head assembly 200 includes a magnetic read head 211. The magnetic read head 211 includes a first sensing element 204a disposed between shields S1 and S2, as well as a second sensing element 204b disposed between the shields S2 and S3. The sensing elements 204a, 204b and the shields S1, S2, and S3 all have surfaces at the MFS 212 facing the magnetic disk 112. In one embodiment, which can be combined with other embodiments, the sensing elements 204a, 204b are TDMR devices sensing the magnetic fields of the recorded bits (such as perpendicularly recorded bits or longitudinally recorded bits) in the magnetic disk 112 by a TDMR effect. In one embodiment, which can be combined with other embodiments, the spacing between shields S1 and S2 and the spacing between shields S2 and S3 is about 17 nm or less.

The head assembly 200 may include a write head 210. The write head 210 includes a main pole 220, a leading shield 206, and a trailing shield (TS) 240. The main pole 220 includes a magnetic material and serves as a main electrode. Each of the main pole 220, the leading shield 206, and the TS 240 has a front portion at the MFS 212. The write head 210 includes a coil 218 around the main pole 220 that excites the main pole 220 producing a writing magnetic field for affecting a magnetic recording medium of the rotatable magnetic disk 112. The coil 218 may be a helical structure or one or more sets of pancake structures. The TS 240 comprises a magnetic material, serving as a return pole for the main pole 220. The leading shield 206 may provide electromagnetic shielding and is separated from the main pole 220 by a leading gap 254.

Figure 3:
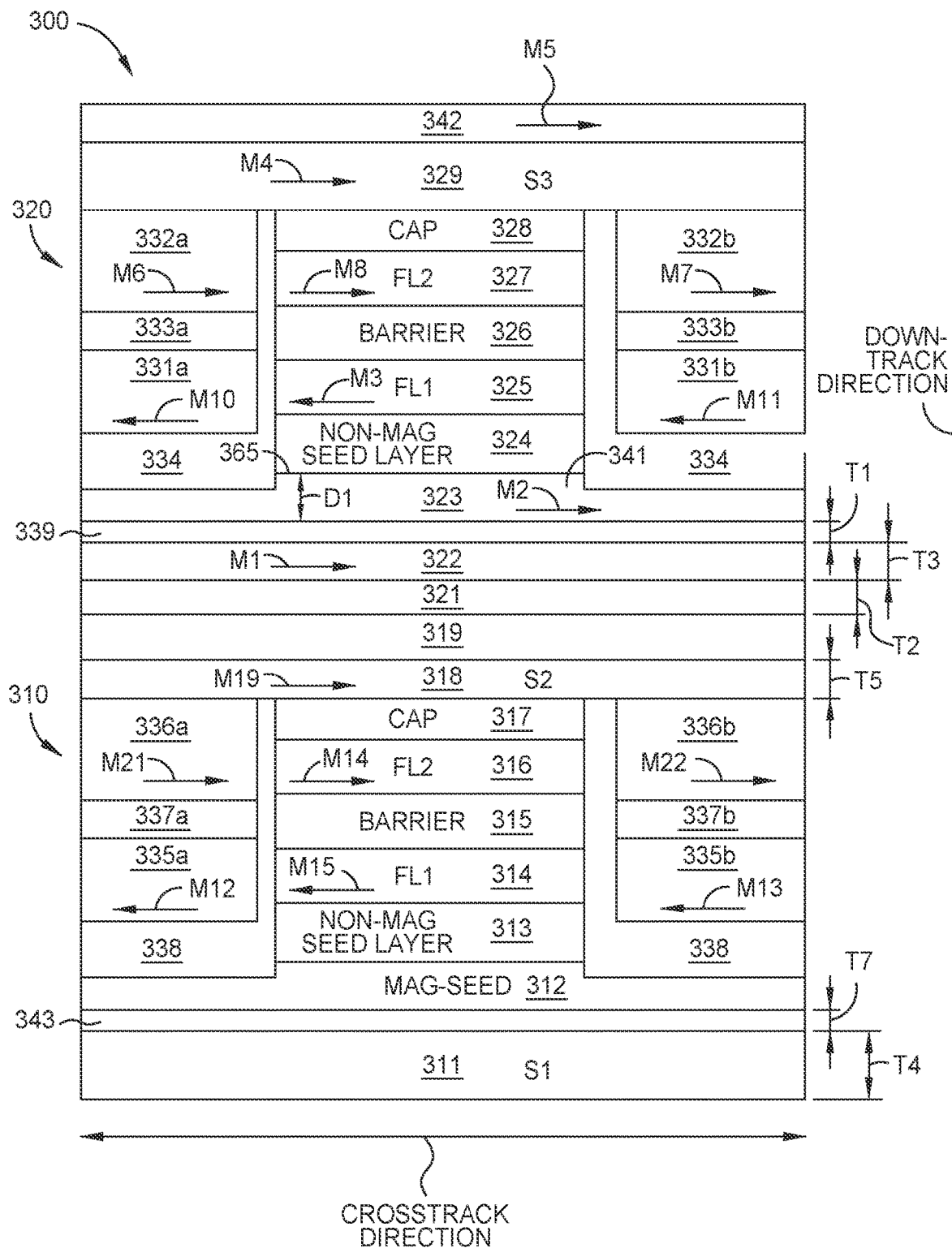
FIG. 3 is a schematic MFS view of a read head, according to one implementation.

FIG. 3 is a schematic MFS view of a read head 300, according to one implementation. The read head 300 can be part of a magnetic recording device, such as the magnetic media drive 100 shown in FIG. 1.

The read head 300 includes a first reader 310, a second reader 320 dispose above the first reader 310 in a downtrack direction, and an insulating separation layer 319 disposed above the first reader 310 and below the second reader 320. The insulating separation layer 319 is disposed between the first reader 310 and the second reader 320. The first reader 310 includes a lower shield 311, a first lower free layer 314 disposed above the lower shield 311, and a second lower free layer 316 disposed above the first lower free layer 314. The first reader 310 includes a second shield 318 disposed above the second lower free layer 316.

The second reader 320 includes a magnetic seed layer 323 disposed above the insulating separation layer 319, and an antiferromagnetic (AFM) layer 322 disposed between the magnetic seed layer 323 and the insulating separation layer 319 to pin the magnetic seed layer 323. The second reader 320 includes a cap layer 328, a first upper free layer 325 disposed between the magnetic seed layer 323 and the cap layer 328, and a second upper free layer 327 disposed between the first upper free layer 325 and the cap layer 328. The second reader 320 includes a barrier layer 326 disposed between the first upper free layer 325 and the second upper free layer 327, and an upper shield 329 disposed above the cap layer 328. The second reader 320 includes a non-magnetic spacer layer 321 disposed between the insulating separation layer 319 and the AFM layer 322. The non-magnetic spacer layer 321 can be omitted such that the insulation separation layer 319 contacts the AFM layer 322. The thickness T2 can be added to a thickness of the insulation separation layer 319. A non-magnetic seed layer 324 is disposed between the first upper free layer 325 and the magnetic seed layer 323.

The second reader 320 includes a plurality of first soft bias side shields 331a, 331b disposed above the magnetic seed layer 323, and a plurality of second soft bias side shields 332a, 332b disposed above the plurality of first soft bias side shields 331a, 331b. The second reader 320 includes a plurality of spacer layers 333a, 333b respectively between the plurality of soft bias side shields 331a, 332a and the plurality of soft bias side shields 331b, 332b. An insulation material 334 is disposed between the layers 323-328 and the layers 331a-332b. The second reader 320 includes a thin dusting layer 339 disposed between the AFM layer 322 and the magnetic seed layer 323. The second reader 320 includes an AFM layer 342 disposed above the upper shield 329. In relation to the implementation shown in FIG. 3, the AFM layer 342 is a second AFM layer.

The first reader 310 includes a magnetic seed layer 312 disposed above the lower shield 311, and a non-magnetic seed layer 313 disposed above the magnetic seed layer 312. The first reader 310 includes a cap layer 317. The first lower free layer 314 disposed between the magnetic seed layer 312 and the cap layer 317. The second lower free layer 316 is disposed between the first lower free layer 314 and the cap layer 317. The first reader 310 includes a barrier layer 315 disposed between the first lower free layer 314 and the second lower free layer 316.

The first reader 310 includes a plurality of first soft bias side shields 335a, 335b disposed above the magnetic seed layer 312, and a plurality of second soft bias side shields 336a, 336b disposed above the plurality of first soft bias side shields 335a, 335b. The first reader 310 includes a plurality of spacer layers 337a, 337b respectively between the plurality of soft bias side shields 335a, 336a and the plurality of soft bias side shields 335b, 336b. An insulation material 338 is disposed between the layers 312-317 and the layers 335a-336b.

The dusting layer 339 of the second reader 320 is formed of one or more of ruthenium (Ru) and/or cobalt-iron (CoFe). The dusting layer 339 is of a thickness T1 in the downtrack direction. The thickness T1 is 1 nm or less. The cap layers 317, 328 are non-ferromagnetic. The cap layers 317, 328 are formed of one or more of tantalum (Ta), titanium (Ti), ruthenium (Ru), and/or cobalt-hafnium (CoHf). Each of the cap layers 317, 328 can include a multilayer structure having layers formed of one or more of tantalum (Ta), titanium (Ti), ruthenium (Ru), and/or cobalt-hafnium (CoHf). The free layers 314, 316, 325, 327 are ferromagnetic. The free layers 314, 316, 325, 327 are formed of one or more of cobalt (Co), iron (Fe), boron (B), nickel (Ni), and/or hafnium (Hf). The barrier layers 315, 326 are formed of MgO. The insulation material 334, 338 and the insulating separation layer 319 are each formed of aluminum oxide (AlOx), magnesium oxide (MgO), and/or other suitable insulation material(s). The non-magnetic spacer layer 321 is formed of ruthenium (Ru), chromium-ruthenium (CrRu), or nickel-chromium (NiCr). The non-magnetic spacer layer is of a thickness T2 in the downtrack direction. The thickness T2 is 2 nm or more. The AFM layer 322 is of a thickness T3 in the downtrack direction. The thickness T3 is within a range of 3 nm to 8 nm. The magnetic seed layer 323 of the second reader 320 includes a platform 341 protruding in the downtrack direction. An upper surface 365 of the platform 341 is disposed at a distance D1 relative to the AFM layer 322. The distance D1 is 10 nm or more, such as within a range of 10 nm to 30 nm. In one embodiment, which can be combined with other embodiments, the distance D1 is within a range of 10 nm to 20 nm.

The magnetic seed layers 312, 323 and the non-magnetic seed layers 313, 324 are each formed of one or more of nickel-iron (NiFe), cobalt-iron (CoFe), (cobalt-boron) CoB, cobalt-iron-boron (CoFeB), and/or cobalt-hafnium (CoHf). Other materials can be used for the seed layers 312, 313, 323, 324. The lower shield 311 is of a thickness T4 in the downtrack direction. The thickness T4 is 100 nm or more. The spacer layers 333a, 333b are formed of ruthenium (Ru). The first and second soft bias side shields 331a-331b, 332a-332b, 335a-335b, 336a-335b are magnetic and conductive. The first and second soft bias side shields 331a-331b, 332a-332b, 335a-335b, 336a-335b are formed of nickel-iron (NiFe) and/or CoFe. The second shield 318 is of a thickness T5 in the downtrack direction. The thickness T5 is less than 40 nm. An optional non-magnetic layer 343 is disposed between the lower shield 311 and the magnetic seed layer 312. The non-magnetic layer 343 is formed of one or more of cobalt-boron (CoB), cobalt-hafnium (CoHf), titanium (Ti), chromium (Cr), and/or nickel-chromium (NiCr). The non-magnetic layer 343 is of a thickness T7 in the downtrack direction. The thickness T7 is 2 nm or more.

The AFM layer 322 pins the magnetic seed layer 323 of the second reader 320. The AFM layer 322, the magnetic seed layer 323, the second upper free layer 327, the AFM layer 342, the upper shield 329, the second shield 318, and the plurality of second soft bias side shields 332a, 332b, 336a, 336b are magnetized in the same magnetization direction, as shown by magnetization arrows M1, M2, M4-M8, and M19. The second upper free layer 327 is magnetized to be antiparallel to the first upper free layer 325, as shown by magnetization arrow M8. Magnetization arrows M10-M15 are also shown in FIG. 3. The AFM layer 322 facilitates pinning the magnetic seed layer 323 to be in the magnetization as shown by the magnetization arrow M2. The shields 311, 318, 329 are each formed of one or more of nickel-iron (NiFe), cobalt-iron (CoFe), (cobalt-boron) CoB, cobalt-iron-boron (CoFeB), and/or cobalt-hafnium (CoHf). Other materials can be used for the shields 311, 318, 329.

The AFM layer 322 and the dusting layer 339 facilitate pinning the magnetic seed layer 323. In one embodiment, which can be combined with other embodiments, a pinning strength for the magnetic seed layer 323 is within a range of 0.1 erg/cm$^2$ to 0.4 erg/cm$^2$.

Figure 4:
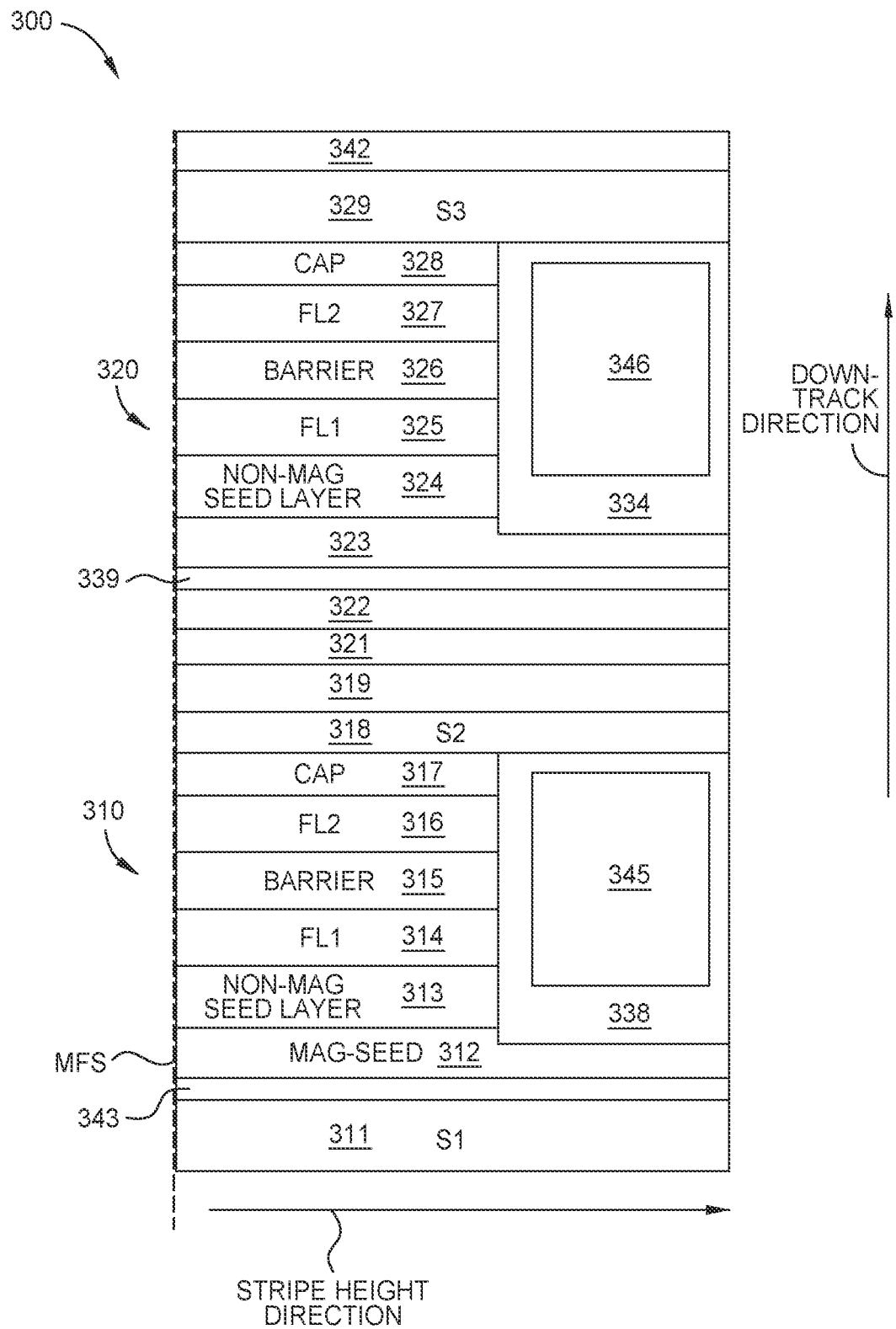
FIG. 4 is a schematic cross-sectional side view of the read head shown in FIG. 3, according to one implementation.

FIG. 4 is a schematic cross-sectional side view of the read head 300 shown in FIG. 3, according to one implementation. Cross-sectional hatching is not shown in FIG. 4 for clarity purposes. The first reader 310 includes a first rear hard bias layer 345 disposed behind the layers 313-317 along a stripe height direction, and the second reader 320 includes a second rear hard bias layer 346 disposed behind the layers 324-328 along the stripe height direction. The first rear hard bias layer 345 and the second rear hard bias layer 346 are formed of cobalt platinum (CoPt) with appropriate seed layers.

Figure 5:
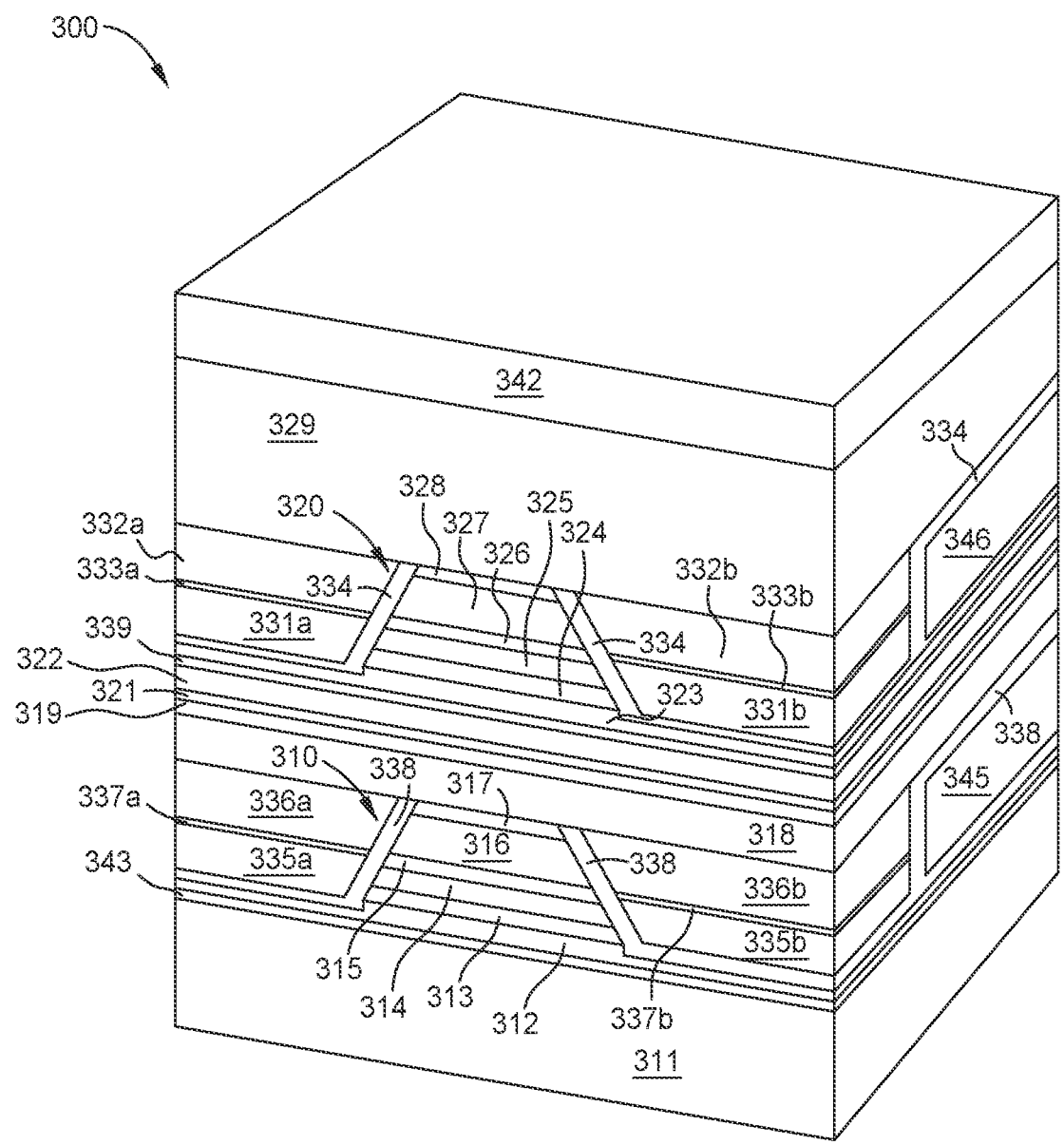
FIG. 5 is a schematic isometric view of the read head shown in FIG. 3, according to one implementation.

FIG. 5 is a schematic isometric view of the read head 300 shown in FIG. 3, according to one implementation.

Figure 6:
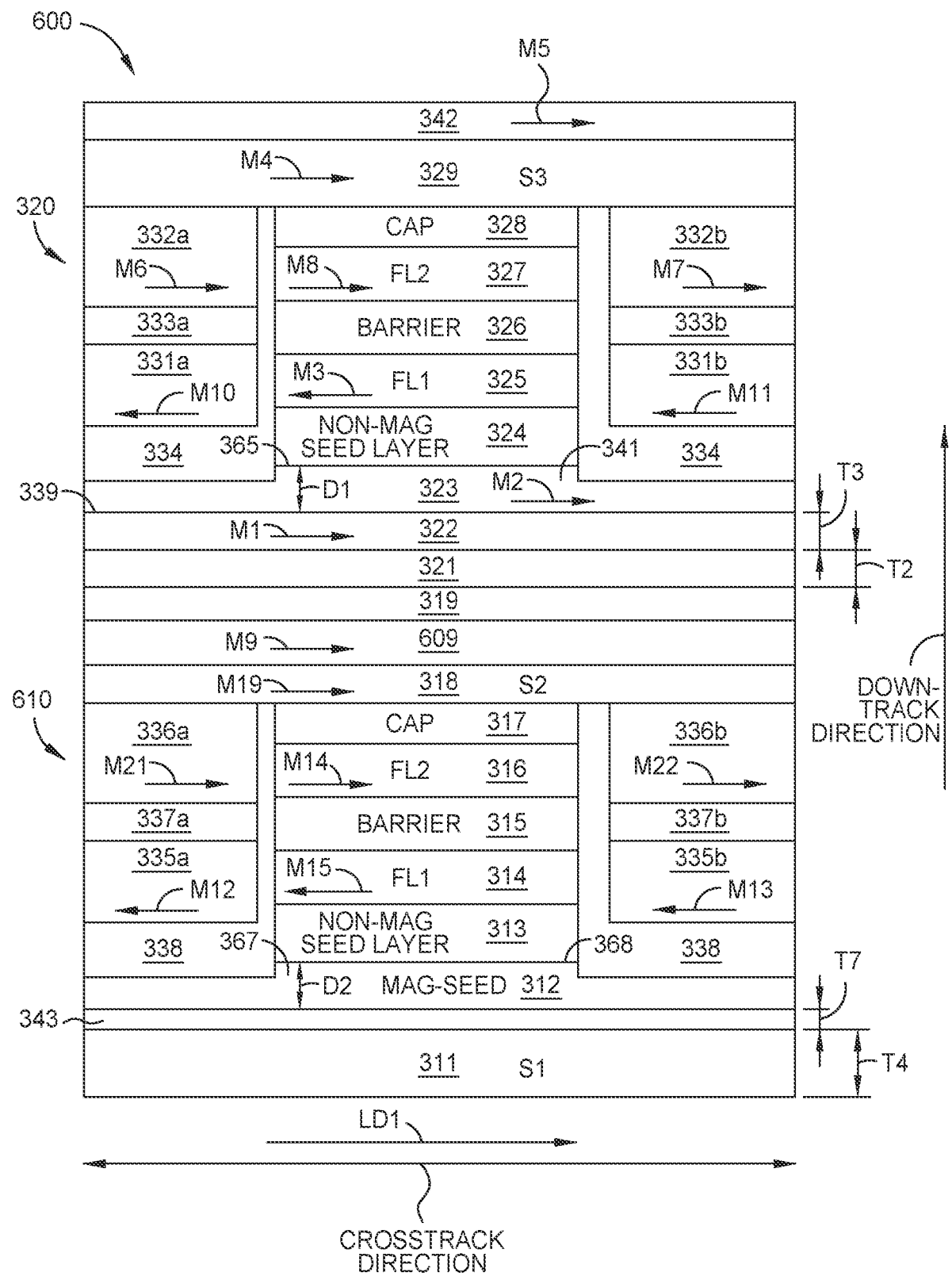
FIG. 6 is a schematic MFS view of a read head, according to one implementation.

FIG. 6 is a schematic MFS view of a read head 600, according to one implementation. The read head 600 can be part of a magnetic recording device, such as the magnetic media drive 100 shown in FIG. 1. The read head 600 is similar to the read head 300 shown in FIG. 3 and includes one or more of the aspects, features, components, and/or properties thereof. As an example, the read head 600 includes the layers 323-328 and the first and second soft bias side shields 331a-332b.

A first reader 610 of the read head 600 includes an AFM layer 609 disposed above the second shield 318. The AFM layer 609 is disposed between the second shield 318 and the insulating separation layer 319. In relation to the implementation shown in FIG. 6, the AFM layer 609 is a first AFM layer, the AFM layer 322 is a second AFM layer, and the AFM layer 342 is a third AFM layer. The magnetic seed layer 312 of the first reader 310 includes a platform 367 protruding in the downtrack direction. An upper surface 368 of the platform 367 is disposed at a distance D2 relative to the lower shield 311. The distance D2 is 100 Angstroms or more. In one embodiment, which can be combined with other embodiments, the distance D2 is within a range of 100 Angstroms to 200 Angstroms.

Each of the first AFM layer 609, the second AFM layer 322, and the third AFM layer 342 is magnetized in the same magnetization direction, as shown by magnetization arrows M1, M5, and M9. Each of the first AFM layer 609, the second AFM layer 322, and the third AFM layer 342 is magnetic and conductive. Each of the first AFM layer 609, the second AFM layer 322, and the third AFM layer 342 is formed of iridium manganese (IrMn).

A method of making a read head is also disclosed. For example, according to a method of making the read head 600 shown in FIG. 6, the second shield 318, the layer 609, and the layers 319, 322-328 are deposited on the cap layer 317 and the second soft bias side shields 336a, 336b. The layers 323-328 are then milled to form the configurations shown in FIG. 6 (including the platform 341). The layers 331a-333b, the second rear hard bias layer 346, and the insulation material 334 are then deposited. The upper shield 329 and the third AFM layer 342 are then deposited. After depositing the upper shield 329 and the third AFM layer 342, a cooling operation is conducted on the read head 600 in a longitudinal field direction LD1. The cooling operation includes heating the read head 600 above a Neel temperature of the AFM layers 322, 342, 609 and allowing the read head 600 to cool down to room temperature. The cooling operation facilitates establishing the magnetizations of the read head 600 (shown, for example, by the magnetization arrows M1, M2, M3-M5, M9, and M19) in a single cooling operation. The cooling operation facilitates reduced operational delays and increased cost efficiencies.

Figure 7:
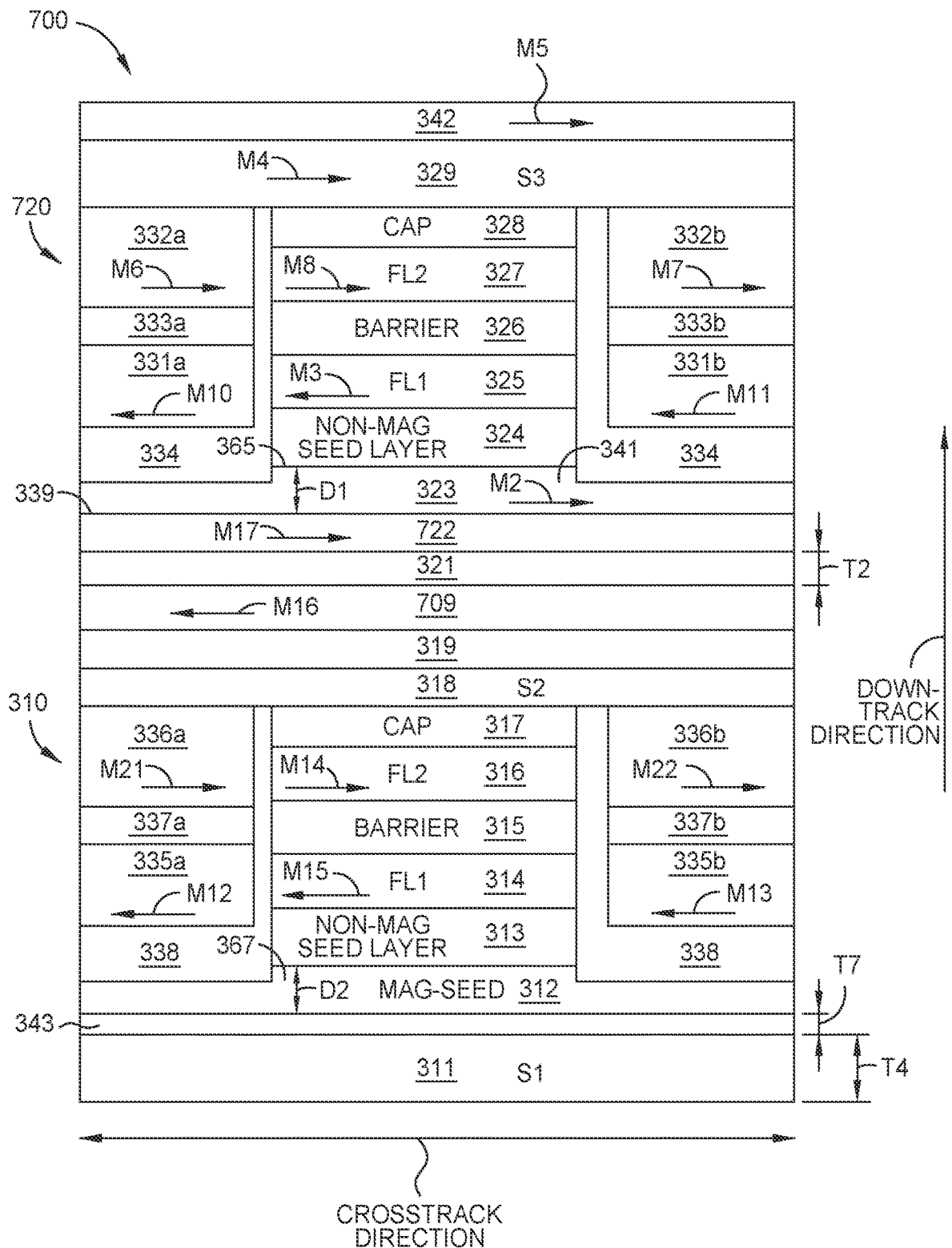
FIG. 7 is a schematic MFS view of a read head, according to one implementation.

FIG. 7 is a schematic MFS view of a read head 700, according to one implementation. The read head 700 can be part of a magnetic recording device, such as the magnetic media drive 100 shown in FIG. 1. The read head 700 is similar to the read head 600 shown in FIG. 6 and includes one or more of the aspects, features, components, and/or properties thereof. As an example, the read head 700 includes the layers 323-328 and the first and second soft bias side shields 331a-332b. The read head 700 is similar to the read head 300 shown in FIG. 3 and includes one or more of the aspects, features, components, and/or properties thereof. As an example, the read head 700 includes the non-magnetic spacer layer 321.

A second reader 720 of the read head 700 includes a first ferromagnetic (FM) layer 709 disposed between the insulating separation layer 319 and the magnetic seed layer 323, and a second FM layer 722 disposed between the first FM layer 709 and the magnetic seed layer 323. The first FM layer 709 and the second FM layer 722 are magnetized antiparallel to each other, as shown by the magnetization arrows M16, M17 in FIG. 7. In the implementation shown in FIG. 7, the non-magnetic spacer layer 321 is disposed between the first FM layer 709 and the second FM layer 722. The non-magnetic spacer layer 321 is formed of ruthenium (Ru) in the implementation shown in FIG. 7.

The first FM layer 709, the non-magnetic spacer layer 321, and the second FM layer 722 are part of a synthetic antiferromagnetic (SAF) structure that facilitates stabilizing the magnetic seed layer 323 of the second reader 720. The SAF structure facilitates inducing a large spin-flop field that facilitates stabilizing the magnetic seed layer 323.

Figure 8:
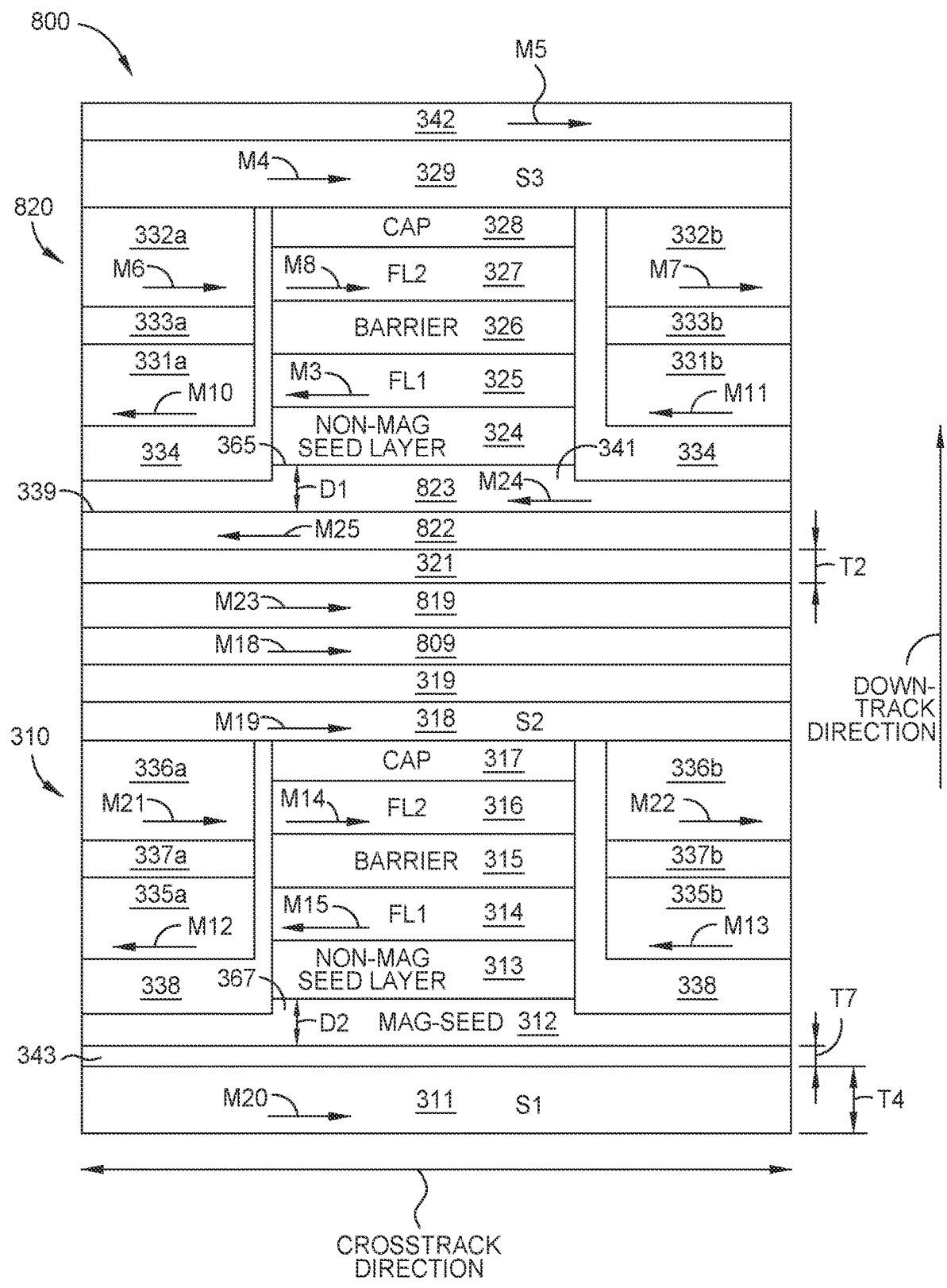
FIG. 8 is a schematic MFS view of a read head, according to one implementation.

FIG. 8 is a schematic MFS view of a read head 800, according to one implementation. The read head 800 can be part of a magnetic recording device, such as the magnetic media drive 100 shown in FIG. 1. The read head 800 is similar to the read head 700 shown in FIG. 7 and includes one or more of the aspects, features, components, and/or properties thereof. As an example, the read head 800 includes the layers 324-328, the first and second soft bias side shields 331a-332b, and the non-magnetic spacer layer 321.

A second reader 820 of the read head 800 includes an antiferromagnetic (AFM) layer 809 disposed between a first FM layer 819 (which is similar to the first FM layer 709 shown in FIG. 7) and the insulating separation layer 319. The AFM layer 809 is magnetic and conductive. The second reader 820 includes a second FM layer 822 (which is similar to the second FM layer 722 shown in FIG. 7) and a magnetic seed layer 823 (which is similar to the magnetic seed layer 323 shown in FIG. 7). The AFM layer 809 is formed of iridium manganese (IrMn).

The AFM layer 809, the magnetic seed layer 823, the second upper free layer 327, the upper shield 329, the plurality of second soft bias side shields 332a, 332b, the plurality of second soft bias side shields 336a, 336b, the second shield 318, and the lower shield 311 are magnetized in the same magnetization direction, as shown by magnetization arrows M4, M6, M7, M8, and M18-M22 in FIG. 8. The first FM layer 819 is magnetized in the same magnetization direction as the AFM layer 809, as shown by magnetization arrows M23, M18. The second FM layer 822 and the magnetic seed layer 823 are magnetized in the same magnetization direction as the first upper free layer 325, as shown by magnetization arrows M3, M24, M25.

In the implementation shown in FIG. 8, the SAF structure facilitates pinning the magnetic seed layer 823 to stabilize the magnetic seed layer 823. The AFM layer 809 facilitates further pinning and stabilizing the magnetic seed layer 823.

Figure 9:
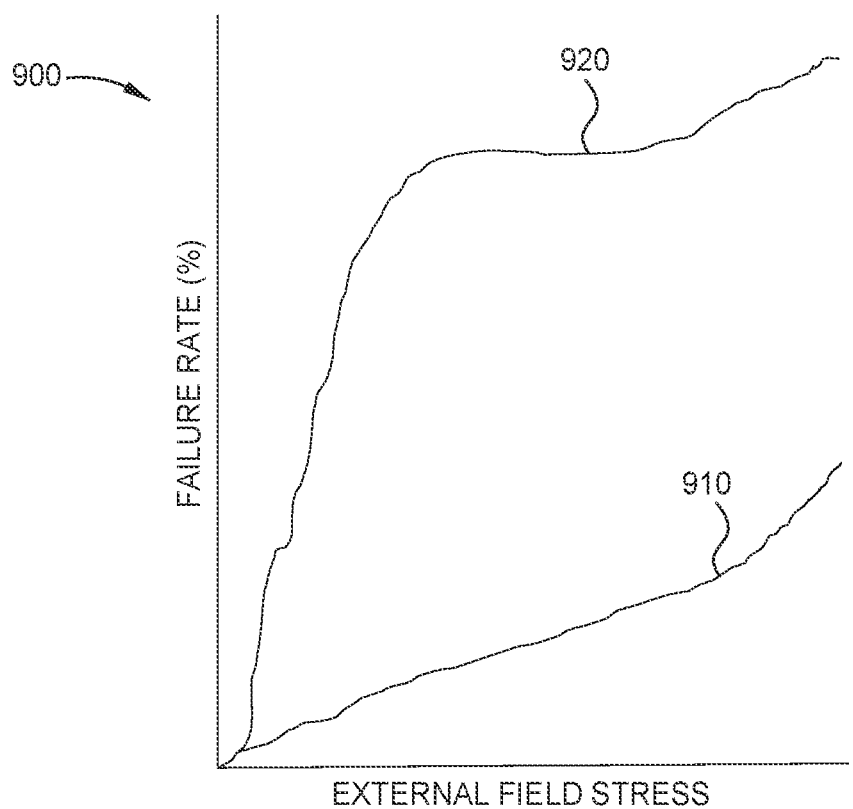
FIG. 9 is a schematic graphical view of a graph showing an expected failure rate, according to one implementation.

FIG. 9 is a schematic graphical view of a graph 900 showing a tested failure rate, according to one implementation. The Y-axis of the graph 900 shows the failure rate of a second reader (e.g., an upper reader) of a read head. The X-axis of the graph 900 shows an external longitudinal field stress applied to the read head. A first profile 910 is plotted using a read head having aspects disclosed herein, such as the magnetic seed layer 323 for the second reader 320. A second profile 920 is plotted with a read head having a configuration different than that of the first profile 910. Across various external field stresses, the graph 900 exhibits that the first profile 910 has greater stability and lower failure rates. Using aspects of the disclosure described herein, it is believed that failure rates can be reduced by about 76% or more, such as about 83% or more. It is believed that pinning the magnetic seed layer 323 to facilitate the magnetization arrow M2 facilitates achieving the reductions in failure rates.

As an example, it is believed that stability for the L-field disturbance of the magnetic seed layer 323 is enhanced during reading/writing operations. Using aspects of the present disclosure, two free layers 325, 327 may be used for the second reader 320 to facilitate increased areal density capability (ADC) for enhanced reader linear resolution performance while facilitating enhanced stability (such as L-field robustness) for the magnetic seed layer 323 and the second reader 320. For example, stability of the second reader 320 is facilitated when magnetic interaction occurs between the magnetic seed layer 323 (such as the platform 341) and the second rear hard bias layer 346, and when structures are formed adjacent platform 341.

Figure 10:
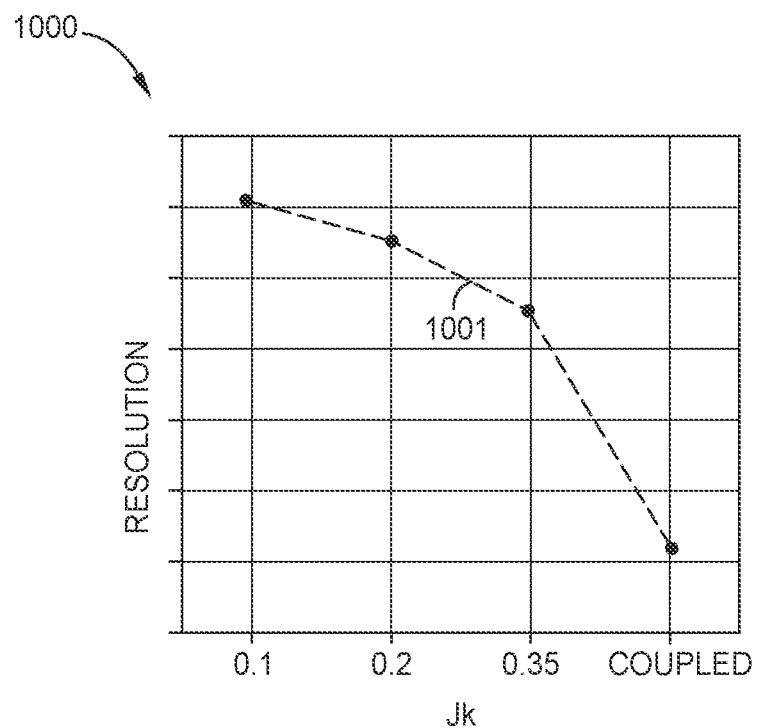
FIGS. 10-12 are schematic graphical views of graphs respectively showing tested reader linear resolution, tested signal-to-noise ratio (SNR), and tested areal density capability (ADC), according to one implementation.
Figure 11:
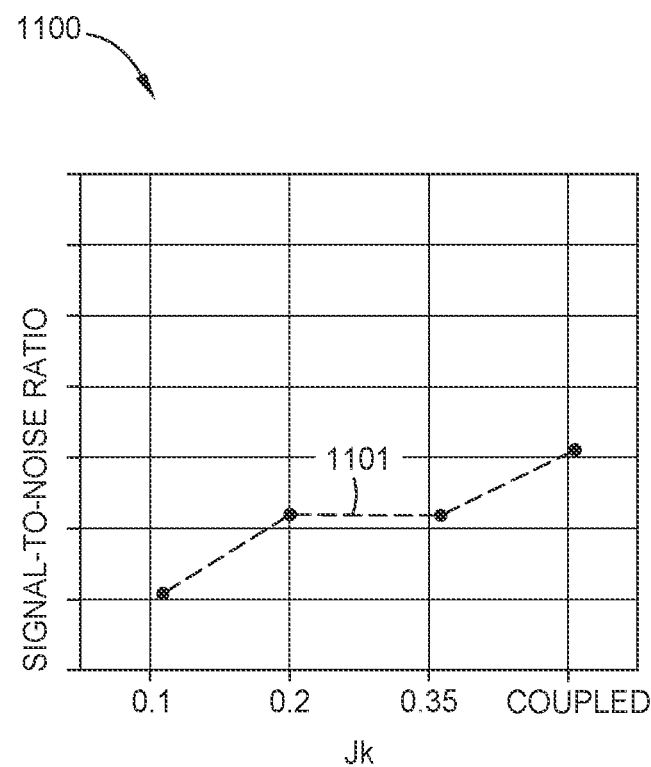
Figure 12:
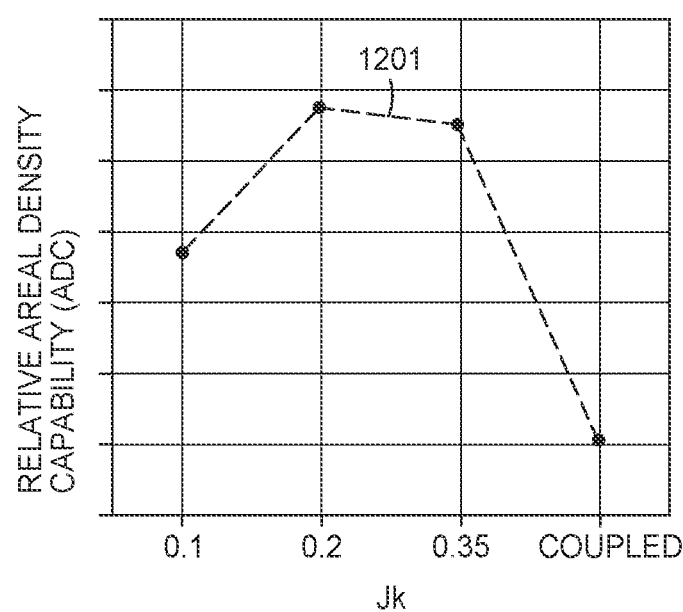

FIGS. 10-12 are schematic graphical views of graphs 1000, 1100, and 1200 respectively showing tested reader linear resolution, tested signal-to-noise ratio (SNR), and tested areal density capability (ADC), according to one implementation. The graphs 1000, 1100, and 1200 show tested data for a second reader (e.g., an upper reader) of a read head.

Profiles 1001, 1101, and 1201 of the graphs 1000, 1100, and 1200 were created using a read head having aspects disclosed herein, such as the magnetic seed layer 323 for the second reader 320. The profiles 1001, 1101, and 1201 respectively show linear resolution, SNR, and ADC across a plurality of AFM pinning strength Jk values. The graphs 1000, 1100, and 1200 show that at weak pinning (shown by lower Jk values), resolution increases and SNR can decrease. Using aspects described herein, there can be an optimal region (such as within a Jk range of 0.2 to 0.35) for low pinning strength with a high ADC that is higher than ADC for other configurations (such as the coupled area shown in FIGS. 10-12) that do not use aspects disclosed herein for stabilizing upper readers. Such benefits are facilitated using aspects described herein.

Benefits of the present disclosure include enhanced ADC and enhanced reader linear resolution performance for higher density recording, enhanced squeezability, beneficial skirt ratio, mitigated signal-to-noise ratio (SNR) losses, using two free layers 325, 327 with a narrow shield-to-shield spacing, a narrow spacing between the magnetic seed layer 323 and the upper shield 329, reduced operational delays, increased cost efficiencies, de-coupling the second shield 318 from the sensor stack of the second reader 320, and enhanced reader stability (such as L-field robustness for the magnetic seed layer 323).

It is contemplated that one or more aspects disclosed herein may be combined. As an example, the present disclosure contemplates that aspects of the read head 300, the read head 600, the read head 700, and/or the read head 800 may be combined. Moreover, it is contemplated that one or more aspects disclosed herein may include some or all of the aforementioned benefits.

In one implementation, a read head for magnetic recording devices includes a first reader. The first reader includes a lower shield, a first lower free layer disposed above the lower shield, a second lower free layer disposed above the first lower free layer, and a second shield disposed above the second lower free layer. The read head includes an insulating separation layer disposed above the first reader, and a second reader. The second reader includes a magnetic seed layer disposed above the insulating separation layer, and an antiferromagnetic (AFM) layer disposed between the magnetic seed layer and the insulating separation layer to pin the magnetic seed layer. The second reader includes a cap layer, a first upper free layer disposed between the magnetic seed layer and the cap layer, and a second upper free layer disposed between the first upper free layer and the cap layer. The second reader includes a barrier layer disposed between the first upper free layer and the second upper free layer, and an upper shield disposed above the cap layer. The AFM layer is of a thickness in a downtrack direction. The thickness is within a range of 3 nm to 8 nm. The second reader includes a dusting layer disposed between the AFM layer and the magnetic seed layer. The dusting layer is formed of one or more of ruthenium (Ru) or cobalt-iron (CoFe). The dusting layer is of a thickness that is 1 nm or less. The second reader includes a non-magnetic spacer layer disposed between the AFM layer and the insulating separation layer. The non-magnetic spacer layer is of a thickness that is 2 nm or more. The magnetic seed layer includes a platform protruding in a downtrack direction. An upper surface of the platform is disposed at a distance relative to the AFM layer, and the distance is within a range of 10 nm to 30 nm. The second reader includes a plurality of first soft bias side shields disposed above the magnetic seed layer, a plurality of second soft bias side shields disposed above the plurality of first soft bias side shields, and a plurality of spacer layers between the plurality of first soft bias shields and the plurality of second soft bias side shields. The magnetic seed layer is pinned such that the magnetic seed layer is magnetized in the same magnetization direction as one or more of the upper shield or the plurality of second soft bias side shields. The AFM layer is magnetized in the same magnetization direction as the magnetic seed layer. The second reader includes a second AFM layer above the upper shield, and the second AFM layer is magnetized in the same magnetization direction as the AFM layer. A magnetic recording device having the read head is also disclosed.

In one implementation, a magnetic device includes a first sensor. The first sensor includes a lower shield, a magnetic seed layer disposed above the lower shield, and a first lower free layer disposed above the magnetic seed layer. The first sensor includes a second lower free layer disposed above the first lower free layer, and a second shield disposed above the second lower free layer. The first sensor includes a first antiferromagnetic (AFM) layer disposed above the second shield. The magnetic device includes an insulating separation layer disposed above the first AFM layer, and a second sensor. The second sensor includes a magnetic seed layer disposed above the insulating separation layer, a second AFM layer disposed between the magnetic seed layer of the second reader and the insulating separation layer to pin the magnetic seed layer of the second sensor. The second sensor includes a cap layer. The second sensor includes a first upper free layer disposed between the cap layer and the magnetic seed layer of the second sensor, a second upper free layer disposed between the first upper free layer and the cap layer, and an upper shield disposed above the cap layer. The magnetic seed layer of the first sensor includes a platform protruding in a downtrack direction. An upper surface of the platform is disposed at a distance relative to the lower shield. The distance is 100 Angstroms or more. The second sensor also includes a third AFM layer disposed above the upper shield. Each of the first AFM layer, the second AFM layer, and the third AFM layer is magnetized in the same magnetization direction. A magnetic recording device having the magnetic device is also disclosed.

In one implementation, a magnetic device for magnetic recording devices includes a first sensor. The first sensor includes a lower shield, a first lower free layer disposed above the lower shield, and a second lower free layer disposed above the first lower free layer. The first sensor includes a second shield disposed above the second lower free layer. The magnetic device includes an insulating separation layer disposed above the first sensor, and a second sensor. The second sensor includes a magnetic seed layer disposed above the insulating separation layer, a first ferromagnetic (FM) layer disposed between the insulating separation layer and the magnetic seed layer, and a second FM layer disposed between the first FM layer and the magnetic seed layer. The FM layer and the second FM layer are magnetized antiparallel to each other. The second sensor includes a non-magnetic spacer layer disposed between the first FM layer and the second FM layer. The non-magnetic spacer layer is formed of ruthenium (Ru). The second sensor includes a cap layer, a first upper free layer disposed between the magnetic seed layer and the cap layer, a second upper free layer disposed between the first upper free layer and the cap layer, and an upper shield disposed above the cap layer. The second sensor includes an antiferromagnetic (AFM) layer disposed between the first FM layer and the insulating separation layer. A magnetic recording device having the magnetic device is also disclosed.

While the foregoing is directed to embodiments of the present disclosure, other and further embodiments of the disclosure may be devised without departing from the basic scope thereof, and the scope thereof is determined by the claims that follow.

What is claimed is:

1. A read head for magnetic recording devices, comprising:
  a first reader comprising:
    a lower shield,
    a first lower free layer disposed above the lower shield,
    a second lower free layer disposed above the first lower free layer, and
    a second shield disposed above the second lower free layer;
  an insulating separation layer disposed above the first reader; and
  a second reader, the second reader comprising:
    a magnetic seed layer disposed above the insulating separation layer,
    an antiferromagnetic (AFM) layer disposed between the magnetic seed layer and the insulating separation layer to pin the magnetic seed layer,
    a non-magnetic spacer layer disposed between the AFM layer and the insulating separation layer,
    a cap layer,
    a first upper free layer disposed between the magnetic seed layer and the cap layer,
    a second upper free layer disposed between the first upper free layer and the cap layer,
    a barrier layer disposed between the first upper free layer and the second upper free layer, and
    an upper shield disposed above the cap layer.

2. The read head of claim 1, wherein the AFM layer is of a thickness in a downtrack direction, wherein the thickness is within a range of 3 nm to 8 nm.

3. The read head of claim 1, wherein the second reader further comprises a dusting layer disposed between the AFM layer and the magnetic seed layer, and the dusting layer is formed of one or more of ruthenium (Ru) or cobalt-iron (CoFe).

4. The read head of claim 3, wherein the dusting layer is of a thickness that is 1 nm or less.

5. The read head of claim 1, wherein the non-magnetic spacer layer is of a thickness that is 2 nm or more.

6. The read head of claim 1, wherein the magnetic seed layer comprises a platform protruding in a downtrack direction, an upper surface of the platform is disposed at a distance relative to the AFM layer, and the distance is within a range of 10 nm to 30 nm.

7. The read head of claim 1, wherein the second reader further comprises:
  a plurality of first soft bias side shields disposed above the magnetic seed layer;
  a plurality of second soft bias side shields disposed above the plurality of first soft bias side shields; and
  a plurality of spacer layers between the plurality of first soft bias shields and the plurality of second soft bias side shields.

8. The read head of claim 7, wherein the magnetic seed layer is pinned such that the magnetic seed layer is magnetized in the same magnetization direction as one or more of the upper shield or the plurality of second soft bias side shields.

9. The read head of claim 8, wherein the AFM layer is magnetized in the same magnetization direction as the magnetic seed layer.

10. The read head of claim 9, wherein the second reader further comprises:
  a second AFM layer above the upper shield, and the second AFM layer is magnetized in the same magnetization direction as the AFM layer.

11. A magnetic recording device comprising the read head of claim 1.

12. A magnetic device, comprising:
  a first sensor comprising:
    a lower shield,
    a magnetic seed layer disposed above the lower shield;
    a first lower free layer disposed above the magnetic seed layer,
    a second lower free layer disposed above the first lower free layer,
    a second shield disposed above the second lower free layer, and
    a first antiferromagnetic (AFM) layer disposed above the second shield;
  an insulating separation layer disposed above the first AFM layer; and
  a second sensor comprising:
    a magnetic seed layer disposed above the insulating separation layer,
    a second antiferromagnetic (AFM) layer disposed between the magnetic seed layer of the second sensor and the insulating separation layer to pin the magnetic seed layer of the second sensor,
    a cap layer,
    a first upper free layer disposed between the cap layer and the magnetic seed layer of the second sensor,
    a second upper free layer disposed between the first upper free layer and the cap layer,
    an upper shield disposed above the cap layer, and
    a third AFM layer disposed above the upper shield, wherein each of the first AFM layer, the second AFM layer, and the third AFM layer is magnetized in the same magnetization direction.

13. The magnetic device of claim 12, wherein the magnetic seed layer of the first sensor comprises a platform protruding in a downtrack direction.

14. The magnetic device of claim 13, wherein an upper surface of the platform is disposed at a distance relative to the lower shield, and the distance is 100 Angstroms or more.

15. A magnetic recording device comprising the magnetic device of claim 12.

16. A read head for magnetic recording devices, comprising:
  a first reader comprising:
    a lower shield,
    a first lower free layer disposed above the lower shield,
    a second lower free layer disposed above the first lower free layer, and
    a second shield disposed above the second lower free layer;
  an insulating separation layer disposed above the first reader; and
  a second reader, the second reader comprising:
    a magnetic seed layer disposed above the insulating separation layer, the magnetic seed layer comprising a platform protruding in a downtrack direction,
    a plurality of first soft bias side shields disposed above the magnetic seed layer,
    a plurality of second soft bias side shields disposed above the plurality of first soft bias side shields,
    a plurality of spacer layers between the plurality of first soft bias shields and the plurality of second soft bias side shields,
    an antiferromagnetic (AFM) layer disposed between the magnetic seed layer and the insulating separation layer to pin the magnetic seed layer,
    a cap layer,
    a first upper free layer disposed between the magnetic seed layer and the cap layer, a second upper free layer disposed between the first upper free layer and the cap layer, a barrier layer disposed between the first upper free layer and the second upper free layer, and an upper shield disposed above the cap layer, wherein the magnetic seed layer is pinned such that the magnetic seed layer is magnetized in the same magnetization direction as one or more of the upper shield or the plurality of second soft bias side shields.

17. The read head of claim 16, wherein the AFM layer is magnetized in the same magnetization direction as the magnetic seed layer.

18. The read head of claim 17, wherein the second reader further comprises:

a second AFM layer above the upper shield, and the second AFM layer is magnetized in the same magnetization direction as the AFM layer.

19. A magnetic recording device comprising the read head of claim 16.

* * * * *